United States Patent [19]

Sircar et al.

[11] Patent Number: 4,690,696
[45] Date of Patent: Sep. 1, 1987

[54] OXIDATION OF CARBONACEOUS MATERIAL

[75] Inventors: Shivaji Sircar, Wescosville; William R. Koch, William, both of Pa.

[73] Assignee: Air Products and Chemicals, Inc., Allentown, Pa.

[21] Appl. No.: 789,002

[22] Filed: Oct. 18, 1985

[51] Int. Cl.⁴ .................................. B01D 53/04
[52] U.S. Cl. .......................... 55/26; 55/31; 55/59; 55/68; 55/74
[58] Field of Search ............. 55/18, 25, 26, 62, 68, 55/74, 75, 179, 387, 389; 210/604, 627, 188

[56] References Cited

U.S. PATENT DOCUMENTS

| | | | |
|---|---|---|---|
| 3,237,377 | 3/1966 | Skarstrom | 55/25 |
| 3,636,679 | 1/1972 | Batta | 55/26 |
| 3,724,667 | 4/1973 | McKinney | 210/627 X |
| 3,833,477 | 9/1974 | Bragerelle et al. | 55/68 X |
| 3,909,409 | 9/1975 | Lange et al. | 210/604 |
| 3,923,477 | 12/1975 | Armond et al. | 55/68 X |
| 4,029,574 | 6/1977 | Reimann | 210/604 |
| 4,077,779 | 3/1978 | Sircar et al. | 55/25 |
| 4,080,287 | 3/1978 | Conway et al. | 210/604 |
| 4,178,239 | 12/1979 | Lowther | 210/627 R |
| 4,249,915 | 2/1981 | Sircar et al. | 55/26 |
| 4,280,824 | 7/1981 | Lassmann et al. | 55/68 X |
| 4,345,939 | 8/1982 | Ratschat | 55/75 X |
| 4,371,380 | 2/1983 | Benkmann | 55/26 |
| 4,430,306 | 2/1984 | Namba et al. | 55/75 X |

FOREIGN PATENT DOCUMENTS 68893  6/1977  Japan ................................. 55/26

*Primary Examiner*—Robert Spitzer
*Attorney, Agent, or Firm*—Geoffrey L. Chase; E. Eugene Innis; James C. Simmons

[57] ABSTRACT

The gaseous effluent from oxidation of organic material with oxygen-rich gas, which effluent contains $CO_2$ (and possible CO) and unreacted residual oxygen, is compressed and charged to a PSA system for selective removal of the $CO_x$, the thus purified oxygen-rich product from the PSA system being recycled to the oxidation reaction. In the PSA system comprised of a plurality of adsorption columns operated in parallel, each column in turn undergoes the steps of: (1) selective adsorption of $CO_2$ from the feed gas; (2) depressuring to near ambient level; (3) purging with air to remove sorbed $CO_2$; and (4) repressuring with part of the recycled effluent from step (1).

7 Claims, 2 Drawing Figures

OXIDATION OF CARBONACEOUS MATERIAL

TECHNICAL FIELD

The present invention relates to oxidation processes and system employing oxygen-containing gas. It is more particularly concerned with such oxidative processes wherein oxygen-rich gas is applied to carbonaceous substances under reaction conditions resulting in production of a gaseous by-product comprising unreacted oxygen contaminated with one or more oxides of carbon ($CO_x$), wherein said by-product is purified to permit recycling or recovery of the purified oxygen-rich product gas.

BACKGROUND OF THE INVENTION

In systems and processes in which oxygen-rich gas is employed in the oxidation of biological or other organic materials, as in fermentation processes, consumption of oxygen is quite small and the reactor effluent contains a large amount of unreacted $O_2$. In order to make such processes economically efficient, one needs to recover and recycle the $O_2$ in the gaseous effluent of the reaction. For example, in the fermentation of a biomass one may employ an oxygen-rich treating gas containing for example about 50% $O_2$ and about 50% $N_2$. The effluent from the fermentation may contain about 5% $CO_2$, 50% $N_2$ and 45% $O_2$. To recycle this effluent without contaminant build-up, it is necessary that the $CO_2$ be first removed.

PRIOR ART

In U.S. Pat. No. 3,833,477 there is disclosed an oxidation process, particularly aerobic fermentation, in which there is obtained a by-product gaseous effluent comprising unreacted oxygen, unreacted inert gas such as nitrogen, and $CO_2$. To recover and recycle the unreacted oxygen at least partially freed of accompanying contaminants, the effluent gas from the fermentation reaction is added to compressed air and the mixture cooled by heat exchange with metal in a regenerator under conditions whereby water and $CO_2$ are removed by condensation. The metal is regenerated by contact with cold nitrogen followed by cold oxygen-containing gas. The purified $O_2$-containing effluent from the regeneration is introduced into a double column rectifier for separation of a portion of light gases, such as nitrogen and argon, therefrom. The oxygen-enriched bottoms fraction from the rectifier is compressed and employed as feed to the biochemical oxidation reactor. As an alternative to the disclosed gas separation procedure the patent envisages that other methods of gas separation may be employed for oxygen enrichment of the feed air by treated recycle gas, such as fractionation by adsorption or by permeation; no details are given as to the envisaged alternatives.

Purification of the off gas from a biological oxidation process to recover and recycle the unreacted oxygen, is disclosed in U.S. Pat. No. 4,371,380. An air stream is fractionated, preferably by low-temperature rectification, and the oxygen-rich fraction (98% $O_2$) employed in the fermentation process together with an added recycle stream of the fermentation effluent from which produced $CO_2$ has been removed by adsorption in silica gel. Nitrogen from the air rectification is used as purge gas to desorb the $CO_2$ from the silica gel, and the adsorber column is repressured with part of the oxygen-rich product gas. The system of the patent employs a plurality of pressure swing adsorbers operated in cycle to undergo in sequence adsorption, two pressure letdown stages, purge with nitrogen, displacement of purge gas and repressuring with (1) effluent gas from the first pressure letdown followed by (2) oxygen-rich product gas from a companion column.

SUMMARY OF THE INVENTION

In accordance with the present invention a simplified and economically efficient system and process are provided in which the gaseous effluent from reaction of biological or other organic material with an oxygen-rich gas is purified in a pressure swing adsorption system (PSA) to selectively remove oxides of carbon, thereby enabling recovery of a purified gas stream containing unreacted oxygen that can be recycled for utilization in the principal oxidation reaction. The PSA process of the invention is carried out in a cyclic system wherein the $CO_2$-containing effluent from the oxidation reaction undergoes the following sequence of steps:

(1) ADSORPTION—The $CO_2$ containing gas is fed at elevated pressure into a bed of solid adsorbent selective in sorbing $CO_2$, until there is a breakthrough of $CO_2$ or somewhat short of breakthrough. During the adsorption step the $CO_2$-freed effluent is withdrawn, part of such effluent being used in a subsequent (step 4) pressurization of the adsorbent bed and the rest being recycled to the principal oxidation reaction.

(2) DEPRESSURE—Following completion of the adsorption step the adsorbent bed is depressured to near ambient pressure level by gas withdrawal in a direction counter to feed gas flow.

(3) PURGE—The bed is then purged in a direction counter to that of the feed gas with ambient air to remove sorbed $CO_2$.

(4) REPRESSURE—Following the purging step the adsorbent bed is brought back to adsorption pressure level using part of the effluent from step (1). The pressurizing gas is passed into the adsorbent bed in a direction counter to that of the feed gas.

By operation in accordance with the invention, characterized by low adsorbent inventory and low operating cost, oxygen-enriched gas feed can be effectively and economically utilized instead of ambient air, to improve oxidation reactions applied to biological and other organic materials.

DETAILED DESCRIPTION OF THE INVENTION

Figure 1:
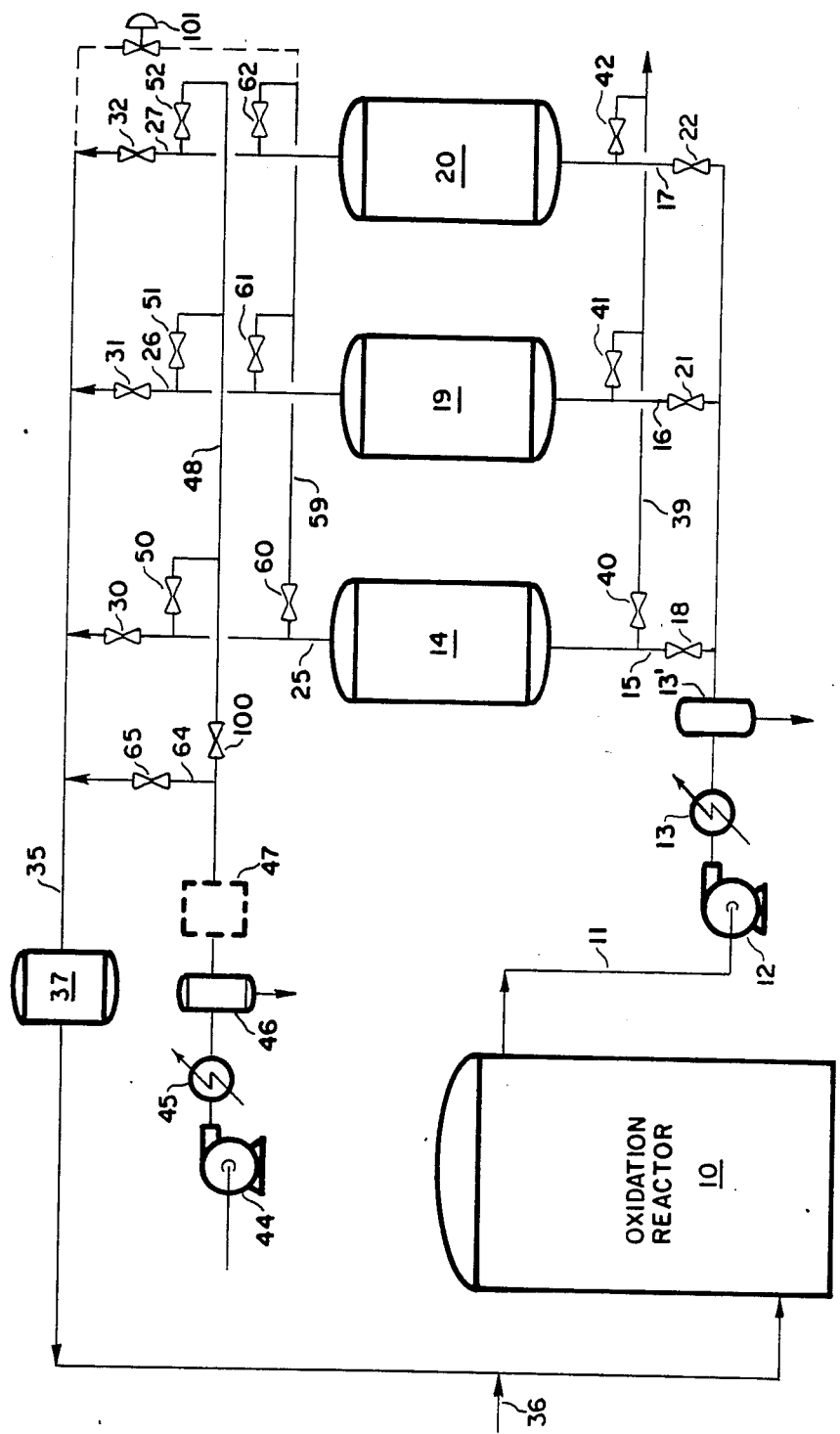
FIG. 1 of the accompanying drawings illustrates by a schematic flow sheet a practical system for practice of the invention, using three adsorber columns operated in cycle timed sequence.
Figure 2:
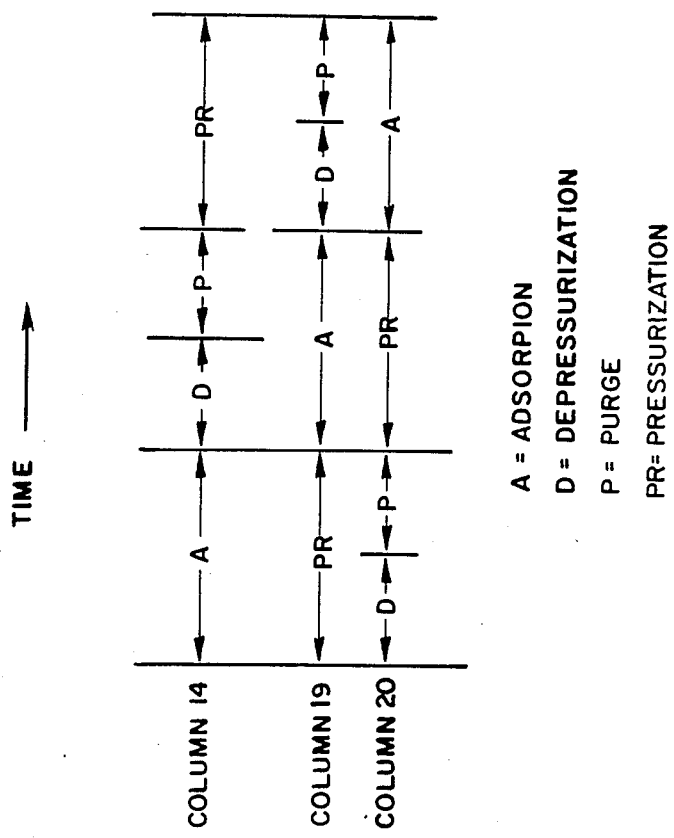
FIG. 2 is a schematic representation of the sequence of steps undergone in turn by each adsorber column of FIG. 1 during a full cycle.

The gaseous effluent from oxidation reactor 10 is withdrawn by line 11, compressed by compressor 12 to desired pressure and introduced into one of the adsorption columns 14, 19, or 20 then on the adsorption stroke of the cycle. In line with the compressor 12 are the conventional after cooler 13 and liquid-vapor separator 13', for cooling and removing any condensate. Assuming that column 14 is then on stream, the gas stream, which contains unreacted nitrogen and oxygen, together with $CO_x$ formed by the oxidation reaction in vessel 10, is passed by line 15 through open valve 18 into column 14. Each of the columns 14, 19, 20 contains a bed of adsorbent selective in retention of carbon oxides with or without the retention of water while essentially permitting other constituents of the feed gas to pass through the column into a gas withdrawal line. Thus, with column 14 being then on-stream for adsorption, the unadsorbed effluent leaves the column via line 25, through open valve 30, and passes into recycle conduit 35 which feeds into reactor 10 via surge tank 37. Makeup oxygen-rich gas is supplied through line 36.

After a predetermined time period valves 18 and 30 are closed and the effluent gas from reactor 10 is passed to the adsorber next to go on adsorption. Assuming this to be column 19, valves 21 and 31 in lines 16 and 26 associated with that column, are opened for the predetermined time period, at the termination of which valves 21 and 31 will be closed and valves 22 and 32 opened, switching the adsorption stroke into and through column 20, via lines 17 and 27 associated with that column.

During part of the time that column 19 is on adsorption, column 14 is subjected to depressuring. This is accomplished by withdrawal of non-adsorbed residual gas from the column voids as well as part of the adsorbed carbon oxides in a direction counter to that of the feed gas flow, by opening of valve 40 leading into discharge manifold 39. The gas from line 39 may be vented to the atmosphere or otherwise used or disposed of in any desired manner.

Following the depressuring of column 14 to about ambient pressure, the column is purged with ambient air to displace sorbed oxides of carbon. During the purging step valve 40 remains open. The purge gas is admitted to column 14 from an air supply manifold 48. Ambient air is compressed by compressor 44 and passed through the conventional after-cooler 45 and gas-liquid separator 46 where a portion of water from the ambient air is condensed out. If desired or required, depending on environment, further drying may optionally be provided for, as indicated at 47, by passing the gas through a drying system such as a desiccant bed in known manner. The extent of compressing and drying of the purge gas prior to entering column 14 depend on the nature of the adsorbent used and its affinity for water. For example, if the adsorbent is hydrophobic carbon, or a highly silicious hydrophobic adsorbent, no compression or drying may be necessary. An air blower can be used to flow the air through the adsorber.

The dried, partially dried or ambient air supplied through manifold 48, after reduction to nearly ambient pressure by pressure let down valve 100, passes into and through column 14 via open valve 50 and line 25. The effluent air leaves the column carrying desorbed $CO_2$ through open valve 40 into discharge manifold 39, to waste or other desired disposition. Purging of columns 19 and 20 in their respective turns is similarly accomplished by passing the purge gas from manifold 48 through column 19 via open valves 51 and 41 and through column 20 via open valves 52 and 42, each discharging into manifold 39.

After column 14 has been purged it is repressured with $CO_x$-free product gas introduced in a direction counter to that of the feed gas. Thus, a gas transfer line 59 is provided connected to each of columns 14, 19, 20 by an associated valve 60, 61, 62 respectively. By opening any two of these valves, gas will be caused to flow through transfer line 59 from the column at higher pressure to the column of lower pressure until the pressure between these columns is substantially equalized. Thus, in repressuring column 14, which is at about ambient pressure following the purge step, part of the gas discharging from column 20 through line 27 passes into gas transfer line 59 through open valve 62 and flows into column 14 through open valve 60 until the pressures in columns 14 and 20 are substantially equal to the adsorption pressure.

Each of valves, 60, 61, 62 is a control valve which operates to proportion the gas discharged from the column then on adsorption so that only part of that discharge passes into recycle conduit 35 and the rest into gas transfer line 59. Thus, the flow control valve (60, 61 or 62) opens partly at the beginning of the adsorption stroke and gradually increases the extent of its opening to fully open position at or near the end of the adsorption step. Alternately valves 60, 61 and 62 can be regular block valves and pressurization is controlled by a single control valve 101 as shown by the dashed line in FIG. 1.

The valve positions during the cycle of operations are tabulated in Table 1, based on a 12 minute cycle, carried out in a system employing three adsorption columns operated in parallel. It will be understood that PSA systems, with a different number of adsorption columns, may be employed with longer or shorter desiged cycle periods, depending among other considerations, on the designed adsorbent capacities of the columns. Also, the invention can be practiced in a single column in discontinuous operation to regenerate the adsorbent.

TABLE 1

| | VALVE POSITIONS DURING CYCLE | | | | | | | | | | | | | | | | | |
|---|---|---|---|---|---|---|---|---|---|---|---|---|---|---|---|---|---|---|
| | Columns | | | Valves | | | | | | | | | | | | | | |
| Time (Min) | 14 | 19 | 20 | 18 | 21 | 22 | 30 | 31 | 32 | 40 | 41 | 42 | 50 | 51 | 52 | 60 | 61 | 62 |
| 0.0–0.5 | A | PR | D | O | C | C | O | C | C | C | C | O | C | C | C | O | O | C |
| 0.5–3.5 | A | PR | P | O | C | C | O | C | C | C | C | O | C | C | O | O | O | C |
| 3.5–4.0 | A | PR | P | O | C | C | O | C | C | C | C | O | C | C | O | O | O | C |
| 4.0–4.5 | D | A | PR | C | O | C | C | O | C | O | C | C | C | C | C | C | O | O |
| 4.5–7.5 | P | A | PR | C | O | C | C | O | C | O | C | C | O | C | C | C | O | O |
| 7.5–8.0 | P | A | PR | C | O | C | C | O | C | O | C | C | O | C | C | C | O | O |
| 8.0–8.5 | PR | D | A | C | C | O | C | C | O | C | O | C | C | C | C | O | C | O |
| 8.5–11.5 | PR | P | A | C | C | O | C | C | O | C | O | C | C | O | C | O | C | O |

TABLE 1-continued

| | VALVE POSITIONS DURING CYCLE | | | | | | | | | | | | | | | | | |
|---|---|---|---|---|---|---|---|---|---|---|---|---|---|---|---|---|---|---|
| | Columns | | | Valves | | | | | | | | | | | | | | |
| Time (Min) | 14 | 19 | 20 | 18 | 21 | 22 | 30 | 31 | 32 | 40 | 41 | 42 | 50 | 51 | 52 | 60 | 61 | 62 |
| 11.5-12.0 | PR | P | A | C | C | O | C | C | O | C | O | C | C | O | C | O | C | O |

A = Adsorption
D = Depressurization
P = Purging
PR = Pressuring
O = Open
C = Closed In practical application of the invention in a biochemical fermentation process, for example, a gas mixture of moderately high oxygen content is employed such as $O_2$-enriched air comprising about 25 to 80% oxygen, the remainder being principally nitrogen, with small to trace amounts of argon and other constituents of atmospheric air. The oxidizing gas mixture is charged to the process at about 5 to 100 psig, preferably at about 30–60 psig. The oxidation reaction results in the discharge of a gaseous effluent containing about 5% (by volume) $CO_2$ and possible trace amounts of CO, the balance being principally $N_2$ plus $O_2$. When operating at 50 psig the effluent gas may be withdrawn from the oxidation reactor at about 10–30 psig, recompressed to about 30–100 psig and then fed to the PSA system. The recovered $N_2/O_2$ product, freed of $CO_2$ and CO, is recycled to the oxidation reactor.

To makeup for $N_2$ lost during desorption, a part of the compressed air from line 48 is fed into line 35 for return to the oxidation reactor 10, via by-pass 64 under control of valve 65.

The preferred adsorbent for use in the PSA columns for $CO_2$ removal is activated carbon. However, other adsorbents selective in removal of $CO_2$ from a mixed gas stream comprising oxygen and nitrogen may be substituted, such as hydrophobic molecular sieve zeolites of various silica-alumina ratio including very high silica material such as silicalites, etc.

The PSA system may be operated at ambient temperature and at adsorption pressure of 30 to 100 psig. While subatmosphereic pressure for desorption may be used without departing from the spirit of the invention, there is no need to sustain the added expense of vacuum operation.

Operating in accordance with the invention 50 to 85 or more percent of the unreacted oxygen discharged from the oxidation reactor is recovered and made available for recycling.

EXAMPLE

The fermentor off gas containing 5.0% $CO_2$, 45% $O_2$ and 50% $N_2$ at 20 psig was compressed to 55 psig and fed to a three column PSA system described above after cooling the gas to about 90° F. Each column of the PSA unit was packed with 1300 lbs. of an activated carbon. Ambient air was used as purge. About 80% of water from the purge air was removed by compression to 50 psig and cooling to 90° F. The recovery of $O_2$ from the PSA unit was 84%.

What is claimed:

1. In the oxidation of biological or other organic substances with an oxygen-rich gas stream containing 25 to 80 volume percent $O_2$, wherein there is evolved a gaseous effluent containing one or more oxides of carbon and unreacted oxygen, and wherein said effluent is freed of oxides of carbon by selective adsorption and the resulting $CO_x$-freed gas residue is recycled for use in said oxidation, the method which comprises the steps of:

(a) discharging the $CO_2$-containing gaseous effluent from the oxidation reaction and compressing the same to a pressure in the range of 30 to 100 psig;
  (b) passing the thus-compressed gas during a fixed time period into and through a bed of adsorbent selective in retention of carbon oxides, while withdrawing from said bed an oxygen-containing gas stream substantially free of carbon oxides;
  (c) following the aforesaid adsorption step (b) depressuring the adsorbent bed by withdrawal of gas therefrom in a direction counter to that of the adsorption step, until the pressure in said bed drops to about ambient atmospheric level;
  (d) while at about ambient atmospheric pressure, purging the bed by passing air therethrough in a direction counter to that of the adsorption step, to remove sorbed oxides of carbon therefrom;
  (e) and thereafter repressuring the purged bed to adsorption pressure by introduction therein of part of the oxygen-containing gas withdrawn during step (b);

wherein said steps (b) through (e) are carried out in a sequentially operated plurality of adsorbent beds wherein:

during the fixed time period that one bed is undergoing step (b), a second bed which has theretofore completed step (b) is subjected during the initial part of that time period to depressuring by gas withdrawal and during the remainder of that fixed time period said second bed is being purged,
  while during that same fixed time period, a third previously purged bed is being repressured to adsorption pressure level.

2. The method as defined in column 1 wherein said bed of adsorbent comprises activated carbon.

3. The method as defined in claim 1 wherein the $CO_2$-containing gaseous effluent from the oxidation reactor is compressed to a pressure of about 50 psig.

4. The method as defined in claim 1 wherein said partly dried air is obtained by compressing ambient air to a pressure in the range of 30 to 100 psig, cooling the compressed air to effect condensation of moisture therein and removing the condensate therefrom.

5. The method as defined in claim 4 wherein dry air is employed in purging the bed, said dry air being obtained by passing the air from which said condensate has been removed through an additional gas drying means.

6. The method as defined in claim 1 wherein dry air is employed in the purging of the bed.

7. The method as defined in claim 1 wherein ambient air is employed in the purging of the bed.

* * * * *